June 19, 1945.  J. P. BURKE  2,378,617
HELICOPTER
Filed Sept. 17, 1943

INVENTOR.
James P. Burke
BY Albert J. Taylor
Atty

Patented June 19, 1945

2,378,617

UNITED STATES PATENT OFFICE 2,378,617

HELICOPTER

James P. Burke, Poland, Ohio

Application September 17, 1943, Serial No. 502,747

1 Claim. (Cl. 244—17)

This invention relates to aircraft and has for its primary object to provide a helicopter having an improved rear rotor mounting means and controls therefor which enable the rear rotor to function more efficiently as a rudder and as means for counteracting the torque of the main rotor, and in addition, to enable the rear rotor to function as an elevator.

Helicopters at the present time are usually equipped with a rear rotor which is mounted in the tail thereof for movement about a vertical axis and which is driven through mechanical connecting means by the main power plant of the helicopter. This invention has for an important object to mount the rear rotor on the helicopter by means so constructed that the rotor may be moved for torque control and steering purposes about a vertical axis, and which in addition thereto may be moved about a horizontal axis so that it may function as an elevator, and to provide such means with controls which may be easily operated by the operator from the control cabinet of the helicopter for effecting such control movements.

Another important object of the invention is to provide a rear rotor and mounting means of the character above mentioned in which the rear rotor is provided with an independent or individual power plant which is subject to control independently of the main power plant of the helicopter. In its preferred form this independent power plant comprises an electric motor directly connected to the rear rotor and operated either by a battery which is charged by a generator operated by the main power plant, or operated directly by a generator operated by the main power plant. A manual speed control is provided in the motor-battery or motor-generator circuit to enable the operator to control the speed of the rear rotor independently of the speed of operation of the main power plant.

Figure 1:
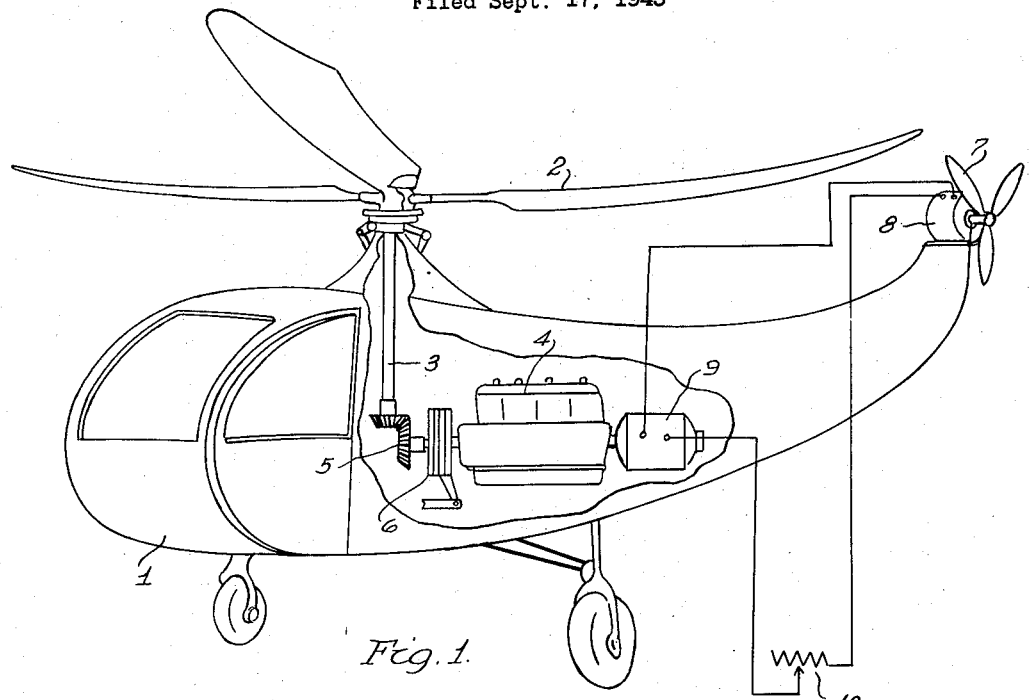
Figure 2:
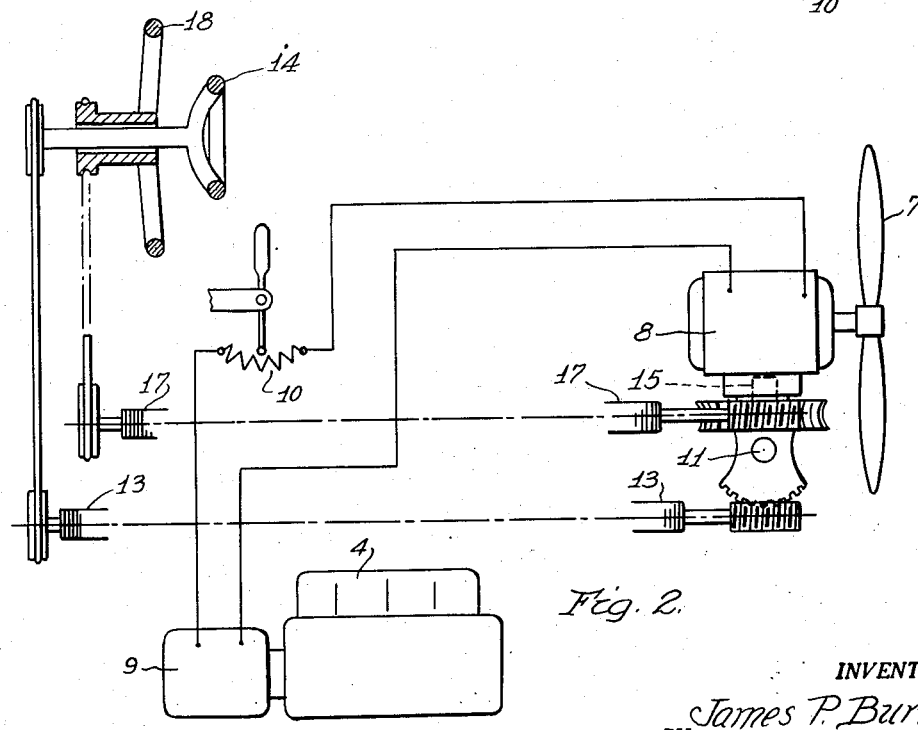

With the above and other ends in view the invention is more fully disclosed with reference to the accompanying drawing, in which Fig. 1 is a schematic view of a helicopter illustrating the novel rear rotor arrangement, and Fig. 2 is a diagram of the rear rotor controls.

More specifically, I designates a helicopter having a main rotor 2 rotatable about the axis of a vertical shaft 3. Within the helicopter is a main power plant 4 which is geared to the vertical shaft 3 as schematically illustrated at 5, and a clutch 6 is provided to connect and disconnect the shaft 2 and the motor 4 at the will of the operator. Rotation of the main rotor 2 causes vertical and forward movement of the aircraft in the manner well known in the art.

In the tail of the helicopter is mounted a rear rotor 7 having an individual electric motor 8 for causing rotation thereof. The motor 8 is operated by current supplied by a generator 9 which is connected to and operated by the main power plant 4. A speed control 10 is provided in the motor-generator circuit so that the operator may control the speed of operation of the rear rotor.

The rear rotor is mounted in such a manner that it may pivot about a horizontal axis or shaft 11 and such pivotal movement may be caused and controlled by the operator through a flexible shaft or other articulate connections illustrated at 13, which may be operated through means of the hand wheel 14. By operating the hand wheel 14 the operator may shift the position of the rear rotor so that the forces it exerts tend to change the attitude of the helicopter to thereby control its horizontal flight. In other words the rear rotor functions as an elevator under such circumstances.

The rear rotor 7 is also mounted for pivotal movement about a vertical axis or shaft 15 and such pivotal movement may be caused and controlled by the operator through means of a flexible shaft or articulate connecting means 17, gearing 16, and a hand wheel 18.

In operation the rotor 7 is caused to operate at the correct speed to counteract the torque of the main rotor 2 according to the conditions of flight by operation of the manual speed control 10. Then by operating the wheel 18 the operator may shift the position of the rear rotor to either increase or decrease the effectiveness or magnitude of the counteracting forces exerted by the rear rotor so that the helicopter may thus be steered in different directions. By operating the wheel 14 the position of the rotor may be shifted to vary the vertical flight of the helicopter. The effectiveness and smoothness of the control over the flight of the helicopter are improved due to the fact that the speed of the rear rotor may be varied as desired while the above mentioned controls are being operated.

Although a specific embodiment of the invention has been illustrated and described it will be understood that various changes may be made within the scope of the appended claim without departing from the spirit of the invention, and such changes are contemplated.

What I claim is:

A helicopter having a main rotor for causing substantially vertical flight, a power plant operatively connected to said main rotor for operating the same, a rear rotor, means supporting said rear rotor for displacement individually and simultaneously about vertical and horizontal axes whereby it acts as both a torque resistor and steering means for the helicopter, an electric motor for causing rotation of said rear rotor, an electric generator associated with and operated by said main power plant, an electric circuit for said generator and electric motor including means for varying the speed of rotation of said rear rotor independently of the speed of operation of the main motor, and dual control means operable individually and simultaneously for shifting the position of said rear rotor about said vertical and horizontal axes.

JAMES P. BURKE.